Dec. 14, 1937.          J. F. QUEREAU          2,102,030
ELECTRICAL MEASURING SYSTEM
Filed June 11, 1935
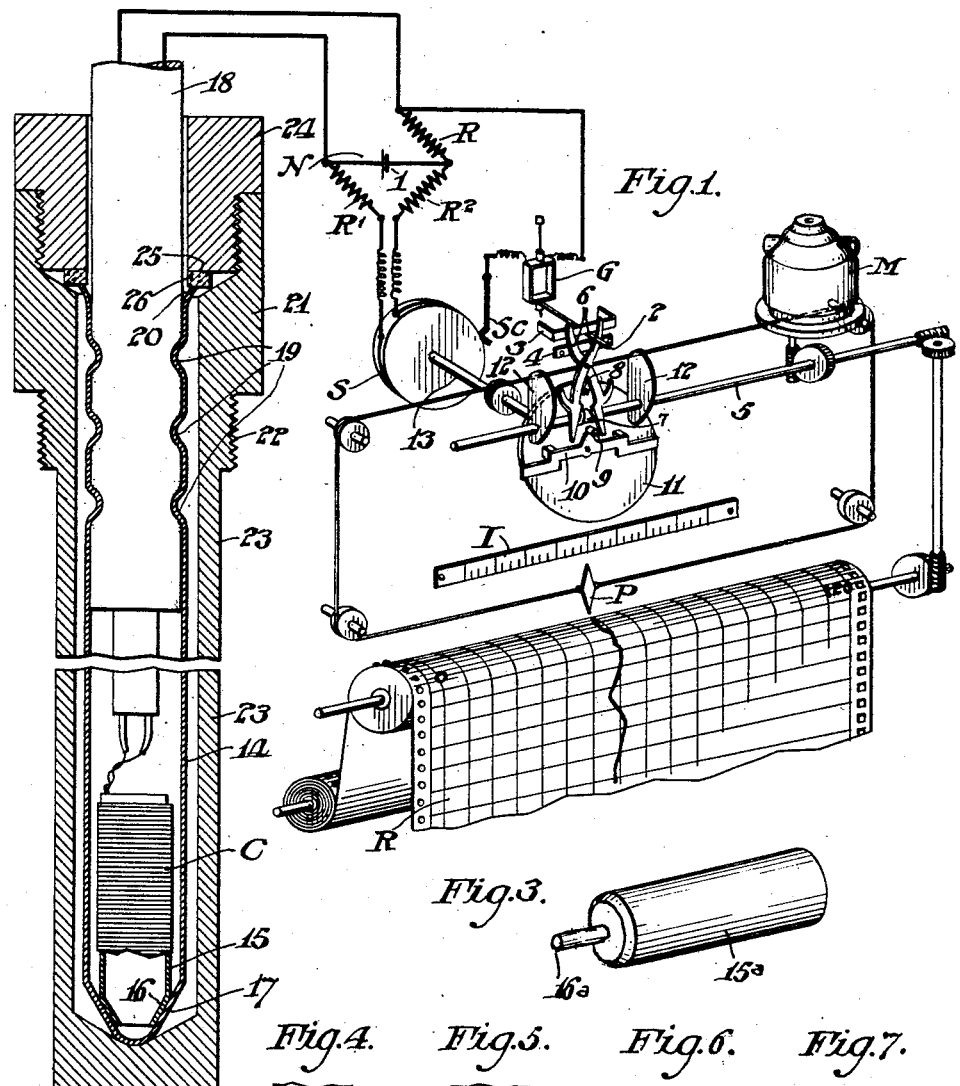
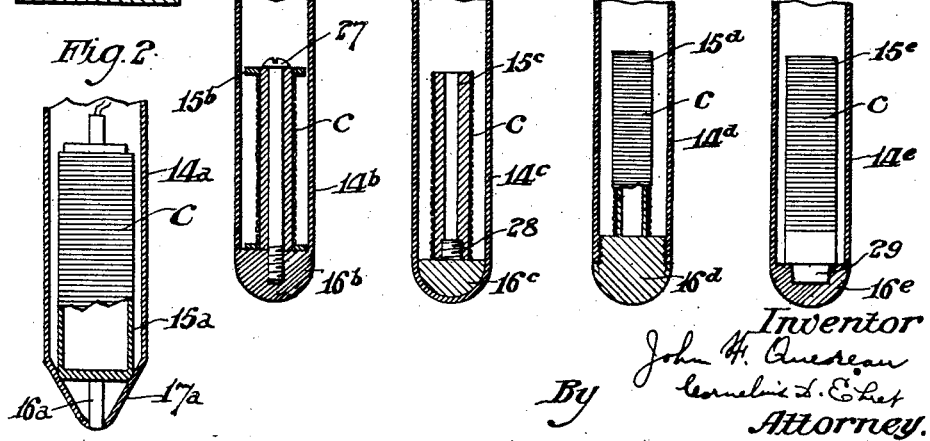
Inventor
John F. Quereau
By Cornelius S. Elet
Attorney.

Patented Dec. 14, 1937

2,102,030

UNITED STATES PATENT OFFICE 2,102,030

ELECTRICAL MEASURING SYSTEM

John F. Quereau, Barren Hill, Pa., assignor to Leeds and Northrup Company, Philadelphia, Pa., a corporation of Pennsylvania Application June 11, 1935, Serial No. 26,065

4 Claims. (Cl. 73—32)

My invention relates to electrical measuring systems for determining temperature by its effect upon the resistance of an electrical conductor, usually in the form of a coil or winding to concentrate a substantial length of conductor in a small space.

In accordance with my invention, to increase the speed of measurement and to reduce errors due to heating of the conductor by the measuring current, the coil, or equivalent, is disposed in intimate thermal relation to a metal form, preferably of copper, whose end is joined to the casing which houses the coil and form.

My invention further resides in the features of construction, combination and arrangement hereinafter described and claimed.

For an understanding of my invention, and for illustration of modifications thereof, reference is to be had to the accompanying drawing, in which:

Fig. 1 represents a temperature measuring system, partly diagrammatic, and with the temperature responsive device partly in section;

Figs. 2 to 7 illustrate various modifications.

Referring to Fig. 1, the coil C is of material having a substantial temperature coefficient of resistance, for example, nickel or copper. It is included in a network N, of the Wheatstone bridge type, including resistances R, R1, R2, and the adjustable resistance or slidewire S. These resistances are of material having a negligible temperature coefficient of resistance, as manganin or constantan. Preferably, the network is of the type shown in Leeds Patent No. 1,097,651, though for convenience of explanation the simpler form is here shown. A suitable source of current I is connected between one pair of conjugate points of the bridge and the galvanometer G, or equivalent, is connected between the other conjugate points of the bridge, one of which consists of the slidewire contact SC.

Upon a change in temperature to which the coil C is subjected the network N is unbalanced, requiring movement of contact SC relative to the slidewire S to rebalance the network. The extent of movement or adjustment of the slidewire necessary to return the galvanometer G to zero or neutral position is indicative of the change in temperature, and a suitably calibrated scale may be associated with the slidewire. In the particular system illustrated the network N is rebalanced automatically, and the adjustment of the slidewire for rebalance moves a recorder pen or marker P with respect to a record strip R. Alternatively, or in addition, the element P may serve as a pointer or index cooperating with a stationary scale I. The mechanism for automatically rebalancing the network may be of the general type shown in Squibb Patent No. 1,935,732.

Briefly, the pointer 2 of galvanometer G is periodically clamped by the movable member 3 against the stationary bar 4. The movement of the arm 3 is controlled by a cam, not shown, disposed on the continuously rotating shaft 5. While the needle is clamped, the two feelers 6, 6 are released by a cam 7, also on shaft 5, so that the spring 8 connecting the feelers is effective to move them towards engagement with the clamped pointer. When one of the feelers engages the pointer, the other in moving toward engagement with the opposite side of the pointer engages at its lower end the pin 9 extending from the driving clutch member 10, and moves the clutch member angularly from the neutral position shown to a position determined by the pointer deflection. Thereafter, in the cycle of operation of the mechanism the clutch member in its displaced position is moved by cam mechanism, not shown, but operated from shaft 5, into engagement with the face of the driven clutch disk 11. Subsequently, in the operation of the recorder, one or the other of the cams 12, depending upon the sense of deflection of the pointer, returns the driving clutch member 10 to its neutral position, while in engagement with the driven clutch member 11, and so rotates its shaft 13, on which the slidewire S is disposed, through an angle corresponding to the galvanometer's deflection.

The coil C is disposed within the protective casing 14 in order that the temperature of fluids may be measured by effectively immersing the coil therein, while preventing actual contact which would adversely affect the characteristics of the coil. In order to increase the speed of measurement, so that the recorder pen or marker P will closely follow the changes in temperature to which the coil is responsive, the coil is wound on a metal tube 15, preferably of copper, whose end 16 is formed, as by spinning, closely to fit the inside of the tip 17 or immersion end of casing 14 to afford a connection of high thermal conductivity between the protective casing and the coil form. The end of the coil form is joined to the inside of tip 17 as by sweat soldering, for example. The material forming the tube 14 should be resistive to corrosion and suitable for soft soldering. Brass is suitable for most uses, and gold is preferred for clinical purposes.

The coil conductor, for example, of nickel or copper, is preferably covered by enamel with an overlying covering of silk. The coating of the conductor with enamel is effective to maintain the resistance of the coil at any one temperature constant within very narrow limits over substantial periods of time, so that accuracy of measurement remains high. The coil is wound directly on the coil form 15 to insure good thermal transfer relation. For electrical purposes the tube 15 may be covered with a thin layer of enamel which increases the insulation resistance of the coil without appreciably affecting the transfer of heat between the coil and the form. Any change in temperature of the medium in which the casing 14 is immersed is rapidly communicated to the coil form, and thence to the coil C to unbalance the measuring network.

Preferably, and as shown in Fig. 1, the coil form is in engagement with the casing 14 substantially only at the tip or closed end of the casing. The rest of the coil form and the coil thereon is spaced from the inside of the casing 14. In most instances, because of the manner in which the responsive device is used, there is a temperature gradient along the casing 14, and in order that the resistance of coil C may be truly representative of the temperature which it is desired to measure or record, the coil and form are substantially isolated from the casing except at the sensitive end. The coil form is preferably thin to have small heat storage capacity.

The coil C, or equivalent fabricated resistor, is connected to conductors external of the responsive device by a cable 18 sealed to the casing 14. This seal substantially prevents entrance of moisture, fumes, or the like, into the interior of the casing 14 which would affect the characteristics of the coil C and introduce errors into the measurements obtained. For any temperature within the range where the coil C may be employed, the cable may be of the lead-covered type, soldered or otherwise suitably joined to the casing 14 at the flared end 20. For low temperatures, for example, those below 150° F., where greater flexibility of the conductor is desired, the coil C may be connected to conductors external to the responsive device by a rubber-covered cable 18 which is sealed to the casing 14 by the depressions or grooves 19 formed in the casing after the cable has been inserted.

When it is desired to measure the temperature of fluids flowing in a pipe, or within an enclosed drum or casing, there is provided the well member 21 provided with a threaded portion 22 to screw into an opening in the pipe so that the portion 23 thereof extends into the pipe, or drum. The inside diameter of the well member 23 is somewhat larger than the external diameter of the casing 14, so that when the responsive device is in position it is in engagement with the well member substantially only at the tip and is not appreciably affected by the temperature gradient along the well member. The responsive device is held in position by the threaded member or bushing 24, preferably of "Bakelite" or the like, which is screwed into the upper end of the well member 23 and has a shoulder 25 which may press against the flared end 20 of the casing 14. Preferably, between the shoulder and the flared end of casing 14 is interposed a packing member 26 which may be a washer of resilient construction. With this well construction the temperature responsive device may be inserted into and withdrawn from the well member whenever desired without escape of the fluid whose temperature is under measurement or without interruption of any process using them.

With my improved construction the speed of response is substantially higher than that of commonly used resistance thermometers. For example, upon a change in temperature the coil may come to its new value of resistance in less than one-half minute, whereas for like conditions similar constructions lacking my invention have required over two minutes to come to equilibrium at the new value of resistance.

My construction has the further advantage that the error due to the heating effect of the measuring current is less than that of present commonly used constructions. To give a specific comparison the temperature rise due to measuring current was only about half of that of a similar thermometer lacking my invention. Therefore, higher accuracy is obtainable or, if desired, the measuring current can be increased with increased sensitivity for changes of temperature and without loss of accuracy as compared with present types.

The thermometer resistance need not be in the form of a coil; it may, for example, be a woven resistor, as disclosed in Tarpley Patent No. 1,972,499, and wrapped upon or suitably held to the outside or inside of form 15, or equivalent. Any arrangement of the resistance wire providing for good thermal transfer relation between the form 15 and the necessary or desired length of the conductor is suitable.

In the modification shown in Figs. 2 and 3, the form 15a is provided with an extension or tip 16a which fits a hole 17a at the end of casing 14a and is joined thereto, as by soldering, to effect a connection of high thermal conductivity between the form 15a and the sensitive end of the casing 14a and to seal the end of the casing. Changes in magnitude of the temperature to which the end of casing 14a is subjected are rapidly communicated to the coil form 15a and thence to the resistance conductor so that the recorder closely follows the temperature changes.

The material forming tube 14a should be resistive to corrosion, suitable for soft soldering, and should not develop any appreciable electromotive force against the solder or other metal serving to unite the coil form to the casing at the tip. For most uses, an alloy having substantially the proportions of 85% copper and 15% zinc is satisfactory. There is inappreciable electrolytic corrosion of the responsive device at the tip, since copper, the principal component of the casing alloy, and lead, the principal component of solder, are close together in the electromotive series. For special uses, it may be necessary to use a casing of other material.

The modification of Fig. 2, as well as all of the modifications herein described, may be used with a well such as shown in Fig. 1.

In the modification shown in Fig. 4, the form 15b is clamped, as by bolt 27, to the tip 16b which threadably receives the lower end of bolt 27. The tip 16b may be integral with the casing 14b and form the closed end thereof, as shown in Fig. 4, or it may be a plug whose shape substantially conforms to the inside of the sealed end of the casing, generally as shown in Fig. 5. In the latter event, the end of the casing is heated to melt the solder, or other low melting point alloy, dropped into the casing before the plug is inserted, or upon the plug. The coil and form assembly may be attached to the plug before it is disposed in the casing, or may be clamped thereto after joinder of the plug to the casing is effected. In either event, the coil and form assembly is held in good thermal transfer relation to the sensitive end of the casing, ensuring rapid measurements of temperature and reduction of errors due to heating of the coil conductor by the measuring current.

In the modification shown in Fig. 5, the plug member 16c, which, in effect, forms the end of the coil form 15c, is provided with a threaded extension which screws into the lower end of coil form 15c. The plug, preferably of copper, or other metal of high heat conductivity, is held, as by solder, to the inside of the tip of the casing. Again, the construction provides for rapid exchange of heat between the tip of the casing and the resistance thermometer coil or winding.

In the modification of Fig. 6, the casing 14d is open at the lower end to receive the plug 16d, preferably of copper or brass, which may be screwed into the casing and/or fastened by solder. The plug 16d, therefore, serves both to seal the casing of which it forms the tip and to provide the end of the coil form 15d which may be integral therewith or suitably fastened thereto.

In the modification of Fig. 7, the tip of the casing is provided with a tapered recess into which is driven the tapered end 29 of the coil form.

It is characteristic of all the constructions described, that heat is rapidly transferred from the tip of the protective casing to the thermometer resistance to procure rapid response to change of the temperature under measurement and substantially to reduce errors due to heating of the thermometer resistance by the measuring current.

While I have illustrated and described various specific modifications, it is to be understood my invention is not limited thereto but is coextensive in scope with the appended claims.

What I claim is:

1. A resistance thermometer comprising a metal form having small heat-storage capacity, a resistor having a substantial resistance-temperature coefficient disposed for exchange of heat by conduction with said form, and a casing enclosing said resistor and form, said casing being joined solely at its sensitive end to said form by solder, said casing being of metal close to solder in the electromotive series.

2. A resistance thermometer comprising a casing, a form of material having high thermal conductivity disposed within said casing and joined thereto only at the sensitive end of said casing whereby the form as a whole assumes the temperature of said sensitive end, said form having low heat capacity whereby its temperature closely follows changes in temperature of said sensitive end, and a resistor having a substantial temperature coefficient of resistance disposed on said form in intimate conductive heat transfer relation therewith, and substantially thermally isolated from said casing except through the contact between said casing and form.

3. A resistance thermometer comprising a well, a unit removably disposed in said well comprising a casing adapted when in position to engage said well only at one end thereof, a form of high thermal conductivity disposed within said casing and in contact with said casing only at its sensitive end, and a resistor having a substantial temperature coefficient of resistance disposed on said form and substantially thermally isolated from said casing except through the contact between said form and said casing.

4. A resistance thermometer comprising a metal casing, a metal form of low heat capacity and high thermal conductivity within said casing and joined solely to the sensitive end of said casing for direct exchange of heat by conduction between them, and a resistor having a substantial resistance-temperature coefficient disposed on said form for exchange of heat between them by conduction.

JOHN F. QUEREAU.